(12) United States Patent
Garrison et al.

(10) Patent No.: US 10,065,567 B2
(45) Date of Patent: Sep. 4, 2018

(54) AUXILIARY STORAGE MOUNTING ARRANGEMENT FOR A VEHICLE

(71) Applicant: GM GLOBAL TECHNOLOGY OPERATIONS LLC, Detroit, MI (US)

(72) Inventors: Cheryl A. Garrison, Shelby Township, MI (US); Nicole T. Bickley, Farmington Hills, MI (US); Michael J. Briskey, Roseville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 99 days.

(21) Appl. No.: 15/203,033

(22) Filed: Jul. 6, 2016

(65) Prior Publication Data

US 2017/0120837 A1 May 4, 2017

Related U.S. Application Data

(60) Provisional application No. 62/250,795, filed on Nov. 4, 2015.

(51) Int. Cl.
*B60R 9/06* (2006.01)
*B62D 33/02* (2006.01)
*B60R 11/06* (2006.01)

(52) U.S. Cl.
CPC .............. *B60R 9/065* (2013.01); *B60R 11/06* (2013.01); *B62D 33/02* (2013.01)

(58) Field of Classification Search
CPC  B60R 9/00; B60R 11/06; B60R 9/065; B60R 9/06; B60R 5/04; B60R 11/00; B60R 5/041; B60R 9/02; B62D 33/0273; B62D 25/2054; B62D 33/04; B62D 33/023; B62D 33/02; B62D 33/03; B62D 25/10; B62D 33/042
USPC ......... 296/37.6, 183.1, 39.2, 100.01, 100.17, 296/37.5, 50, 51, 57.1; 29/428, 401.1; 224/404, 274, 282, 402, 486, 535, 538, 224/539, 540, 548; 312/333, 311, 326, 312/330.1
See application file for complete search history.

(56) References Cited

U.S. PATENT DOCUMENTS

| | | | | |
|---|---|---|---|---|
| 6,676,182 B2 * | 1/2004 | Fitts | .......................... | B60P 3/40 224/403 |
| 7,111,886 B1 * | 9/2006 | Miller | ....................... | B60P 3/40 296/26.11 |
| 7,488,021 B1 * | 2/2009 | Roos | ......................... | B60P 3/40 296/26.11 |
| 2008/0217944 A1 * | 9/2008 | Wood | .................. | B62D 33/0207 296/26.11 |
| 2009/0250962 A1 * | 10/2009 | Polewarczyk | ............ | B60P 7/14 296/57.1 |

(Continued)

*Primary Examiner* — Darrell G Dayoan
*Assistant Examiner* — Sunsurraye Westbrook
(74) *Attorney, Agent, or Firm* — Quinn IP Law

(57) ABSTRACT

A vehicle includes a cargo area at least partially defined by a first sidewall, a second sidewall disposed opposite the first sidewall and a floor cooperating with and extending between the first and second sidewalls. At least one tie down member is disposed on at least one of the first and second sidewalls. An auxiliary storage unit having a housing and a mounting bracket extending from the housing is removably secured to the at least one tie down member. The auxiliary storage unit is adjustable about the mounting bracket between at least a first position and a second position.

18 Claims, 4 Drawing Sheets

(56) References Cited

U.S. PATENT DOCUMENTS

2013/0049395 A1\* 2/2013 Poirier .................... B60R 5/041
                                                            296/37.6

\* cited by examiner

AUXILIARY STORAGE MOUNTING ARRANGEMENT FOR A VEHICLE

CROSS REFERENCE TO RELATED APPLICATIONS

This application claims the benefit of U.S. Provisional Patent Application No. 62/250,795, entitled "AUXILIARY STORAGE MOUNTING ARRANGEMENT FOR A VEHICLE" and filed on Nov. 4, 2015, which is incorporated by reference in its entirety in this disclosure.

TECHNICAL FIELD

The present disclosure relates to an auxiliary storage unit mounting arrangement for a cargo area of a vehicle.

BACKGROUND

Pickup trucks generally include a cargo area that is open and exposed to exterior elements and commonly used to transport materials and oversize cargo between locations. The cargo area is typically defined by a cargo floor, two sidewalls, and a portion of the rear surface of the passenger compartment of a vehicle. Most cargo areas include an opening at the rearward facing end to facilitate the loading and unloading of cargo onto the cargo floor.

One or more tie down or anchoring points may be provided in the cargo area of the pickup truck bed to receive a strap, rope or the like to ensure cargo does not move in the bed during operation of the vehicle. In order to secure personal items in the cargo box, a separate, lockable toolbox may be placed and secured to the cargo box. However, the toolbox reduces the length of the cargo box available for cargo and is generally permanently affixed to the cargo area.

SUMMARY

A vehicle includes a cargo area at least partially defined by a first sidewall, a second sidewall disposed opposite the first sidewall and a floor cooperating with and extending between the first and second sidewalls. At least one tie down member is disposed on at least one of the first and second sidewalls. An auxiliary storage unit having a housing and a mounting bracket extending from the housing is removably secured to the at least one tie down member. The auxiliary storage unit is adjustable about the mounting bracket between at least a first position and a second position.

The auxiliary storage unit mounting bracket further comprises an elongate bracket body releasably secured to the at least one tie down member, a receiving member disposed proximate to and cooperating with the auxiliary storage unit and at least one hinge pivotally connecting the elongate bracket body and receiving member. The at least one tie down member disposed on at least one of the first and second sidewalls extends through one or more retention slots defined by the elongate bracket body.

The elongate bracket body further comprises an upper flange and an opposing lower flange cooperating to define the one or more retention slots in the elongate bracket body and sized to receive and align with the at least one tie down member. A connector extends at least partially through each of the upper and lower flanges of the elongate bracket body and the at least one tie down member to releasably secure the auxiliary storage unit to the at least one tie down member.

The receiving member further comprises a support member secured to the auxiliary storage unit housing and a locking device cooperating with the support member to releasably engage the at least one tie down member. The vehicle cargo area further comprises a storage compartment of a pickup truck defined by the first sidewall, the second sidewall disposed opposite the first sidewall, the floor cooperating with the opposing first and second sidewalls and a tailgate adjustably connected to one of the first sidewall, second sidewall or the floor to adjustably position the tailgate between at least a first position wherein the tailgate is disposed proximate to and substantially parallel with the floor and a second position wherein the tailgate is disposed proximate to and extending substantially perpendicularly relative to the floor.

In another embodiment of the disclosure, a vehicle includes a cargo area at least partially defined by a first sidewall, a second sidewall disposed opposite the first sidewall and a floor cooperating with and extending between the first and second sidewalls. An auxiliary storage unit mounting bracket includes an elongate bracket body releasably secured to the at least one tie down member.

An auxiliary storage unit having a housing and a receiving member is disposed proximate to and cooperating with the auxiliary storage unit. At least one hinge pivotally connects the elongate bracket body and receiving member. The auxiliary storage unit is adjustable relative to at least one of the first and second sidewalls between at least a first position and a second position.

The at least one tie down member disposed on at least one of the first and second sidewalls extends through one or more retention slots defined by the elongate bracket body. The elongate bracket body further comprises an upper flange and an opposing lower flange cooperating to define the one or more retention slots in the elongate bracket body and sized to receive and align with the at least one tie down member. A connector extends at least partially through each of the upper and lower flanges of the elongate bracket body the at least one tie down member to releasably secure the auxiliary storage unit to the at least one tie down member.

The receiving member further comprises a support member secured to the auxiliary storage unit housing and a locking device cooperating with the support member to releasably engage the at least one tie down member. The vehicle cargo area further comprises a storage compartment of a pickup truck defined by the first sidewall, the second sidewall disposed opposite the first sidewall, the floor cooperating with the opposing first and second sidewalls and a tailgate adjustably connected to one of the first sidewall, second sidewall or the floor to adjustably position the tailgate between at least a first position wherein the tailgate is disposed proximate to and substantially parallel with the floor and a second position wherein the tailgate is disposed proximate to and extending substantially perpendicularly relative to the floor.

In yet another embodiment of the disclosure, an auxiliary storage unit for a vehicle cargo area comprises a housing defining an outer periphery and an inner periphery and a panel adjustably connected to a portion of the housing and movable between at least a closed position wherein the panel is at least partially covering the inner periphery of the housing and at least one open position, An auxiliary storage unit mounting bracket includes an elongate bracket body releasably securable to the vehicle cargo area and a receiving member disposed proximate to and cooperating with the auxiliary storage unit housing. The auxiliary storage unit mounting bracket further comprises at least one hinge pivotally connecting the elongate bracket body and receiving member to removably connect and adjustably position the auxiliary storage unit relative to the vehicle cargo area.

At least one tie down member is disposed in the vehicle cargo area and cooperates with the auxiliary storage mounting bracket to removably connect and adjustably position the auxiliary storage unit relative to the vehicle cargo area. The elongate bracket body further comprises an upper flange and an opposing lower flange cooperating to define one or more retention slots in the elongate bracket body sized to receive and align with the at least one tie down member.

A connector extends at least partially through each of the upper and lower flanges of the elongate bracket body the at least one tie down member to releasably secure the auxiliary storage unit to the at least one tie down member. The receiving member further comprises a support member secured to the outer periphery of the auxiliary storage unit housing and a locking device cooperating with the support member to releasably engage the at least one tie down member. The housing further comprises one or more compartments formed in the inner periphery of the housing. The housing further comprises at least one drawer slidably connected to the inner periphery of the auxiliary storage unit.

The above features and advantages, and other features and advantages of the disclosure, will be readily apparent from the following detailed description of the embodiment(s) and best mode(s) for carrying out the disclosure when taken in connection with the accompanying drawings and appended claims.

DETAILED DESCRIPTION

Figure 1A:
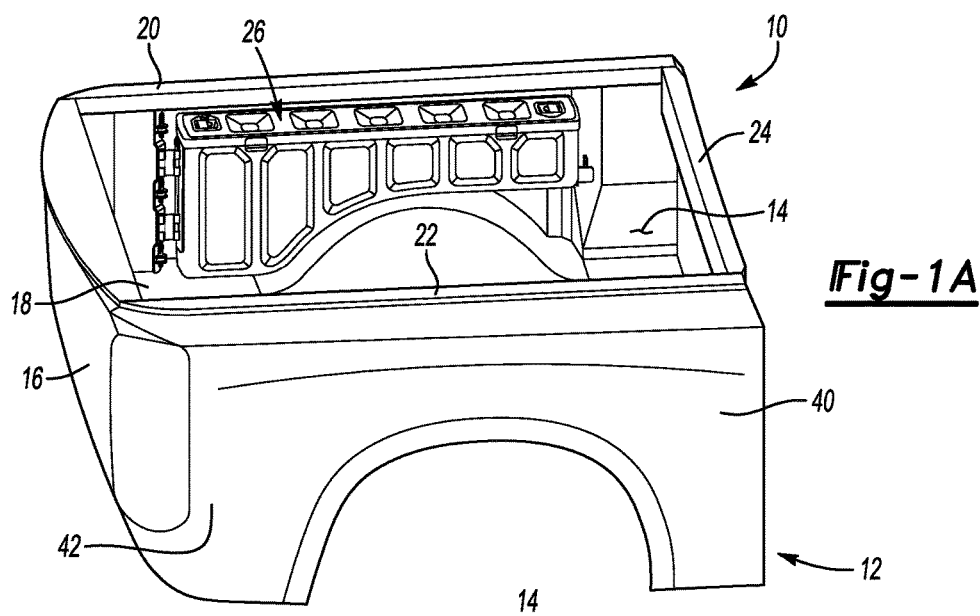
FIG. 1A is a perspective view of a portion of a vehicle illustrating a cargo area incorporating an auxiliary storage unit in accordance with the disclosure.

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar to directional terms are not to be construed to limit the scope of the disclosure in any manner.

Figure 1B:
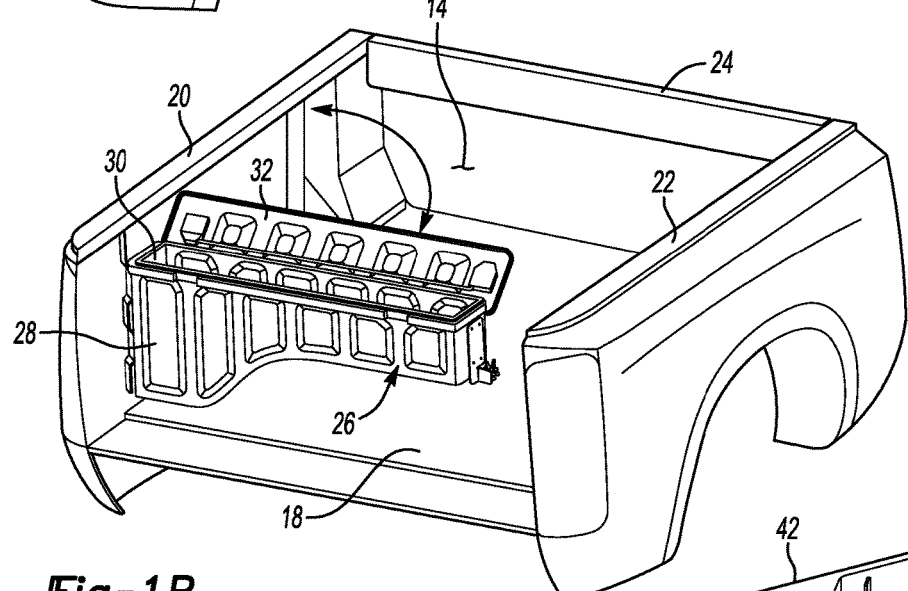
FIG. 1B is a perspective view of a mounting arrangement for securing and positioning the auxiliary storage unit in the cargo area of the vehicle.

Referring to the drawings, wherein like reference numbers correspond to like or similar components throughout the several Figures, FIGS. 1A-1B shows a rear portion of a motor vehicle 10. Vehicle 10 is shown for illustrative purposes and demonstrates only one possible environment into which a cargo area 12 may be defined. It is understood that use of direction terms relative to the vehicle orientation may be used throughout the description regarding location of the components within the vehicle 10. Thus, the forward direction would be toward an engine compartment for the vehicle 10 and opposite the rear end of the vehicle 10.

A cargo area 12 includes a cargo space 14 at least partially defined by a first sidewall 20, an opposing second sidewall 22, a third sidewall or front wall 24, a fourth sidewall or tailgate 16 and a floor 18. The front wall 24 may be a component of the cargo area 12 or, alternatively, a rear surface of the passenger compartment of the vehicle 10. The tailgate 16 of vehicle 10 is shown in a closed position in FIG. 1A and is removed for illustration of the cargo space of the cargo area of the vehicle in FIG. 1B. It is understood that the tailgate 16 may be moved to an open position generally planar with the floor of the cargo area.

Vehicle 10 may be a pickup configuration, but the disclosure is not limited to a pickup-type vehicle and may be incorporated in the passenger compartment or other area of a vehicle to accomplish the purposes of this disclosure. The vehicle may include, but not be limited to, a commercial vehicle, industrial vehicle, passenger vehicle, aircraft, watercraft, train or any movable platform. It is also contemplated that the vehicle may be any mobile platform, such as an airplane, all-terrain vehicle (ATV), boat, personal movement apparatus, robot and the like to accomplish the purposes of this disclosure.

The cargo area 12 may be enclosable on four sides. The cargo area 12 may include one or more sidewalls forming generally vertical perimeter walls, shown as a first sidewall 20 and an opposing second sidewall 22. The first sidewall 20 may be configured as a left sidewall of the cargo area 12, while the second sidewall 22 is configured as a right sidewall opposing the left sidewall 20. The first sidewall 20 and the second sidewall 22 are arranged substantially parallel to each other. Further, the front wall 24 extends substantially parallel relative to the tailgate 16. Accordingly, the front wall 24 and the tailgate 16 cooperate with the first sidewall 20 and the second sidewall 22 to define a perimeter of the cargo space 14 of the cargo area 12.

The floor or truck bed 18 of the vehicle 10 extends generally laterally between the first sidewall 20 and the second sidewall 22, and longitudinally between the front wall 24 and the tailgate 16. While the vehicle 10 is shown as a pickup truck, it should be appreciated that it may be any vehicle that has walls and a floor or a base defining a cargo area. As shown in FIG. 1A, the tailgate 16 may be pivotally connected to the sidewalls 20 and 22 or a portion of the floor 18 or other rearwardly disposed portion of the vehicle body for ease of loading and unloading the cargo area 12.

An auxiliary storage unit 26 may be disposed with the cargo space 14 of the cargo area 12. The auxiliary storage unit configuration shown in the Figures is provided for exemplary purposes only. For example, auxiliary storage unit 26 may be formed in a variety of distinct geometries and configured to offer multiple storage and use functions while accomplishing the objectives of the disclosure.

Auxiliary storage unit 26 includes a housing 28 defining an outer periphery and an inner periphery having one or more compartments 30 formed therein. In one embodiment of the disclosure, a panel 32 may be adjustably connected to a portion of the housing 28 and movable between a closed position shown in FIG. 1A wherein the panel 32 is at least partially covering the one or more compartments 30 in the auxiliary storage unit housing 28 and at least one open position shown in FIG. 1B wherein the panel 32 to expose the one or more compartments 30 in the auxiliary storage unit 26. It is understood that the one or more compartments 30 of the auxiliary storage unit housing 28 may be provided in different locations and serve different purposes. In one embodiment of the disclosure, the storage unit housing 28 may include at least one slidably connected drawer unit disposed in the inner periphery of the auxiliary storage unit housing 28 to be positioned or translated between a closed position and an open position.

Figure 2:
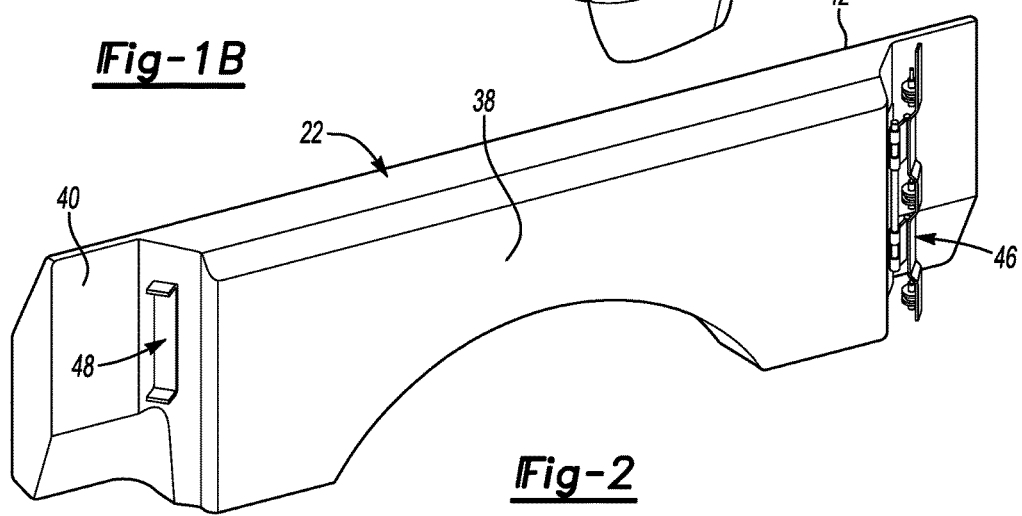
FIG. 2 is a perspective view of a sidewall of the cargo area incorporating a portion of the mounting arrangement of the disclosure.
Figure 3:
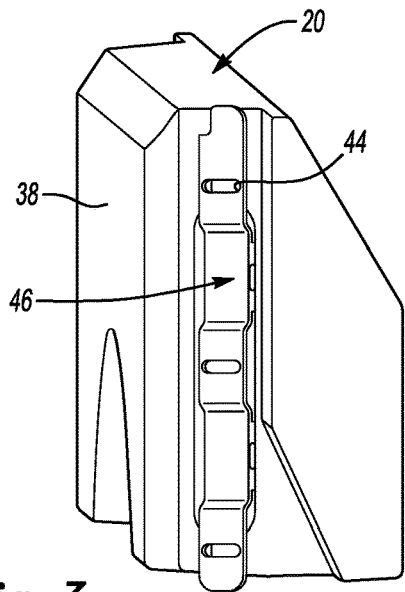
FIG. 3 is a perspective view of a receiving portion of a mounting bracket of the mounting arrangement disposed on a rear portion of the sidewall of the cargo area.
Figure 4:
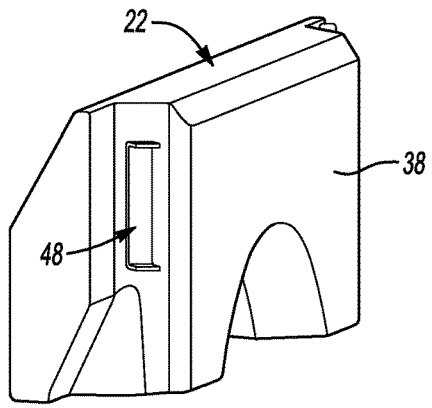
FIG. 4 is a perspective view of a receiving member of the mounting arrangement disposed on a front portion of the sidewall of the cargo area.

Referring additionally now to FIGS. 2-4, a mounting arrangement for releasably securing the auxiliary storage unit 26 to a portion of the cargo area 12 of the vehicle 10 is described in greater detail. A portion of a sidewall 22 of the cargo area 12 is shown in FIG. 2. It is understood that the mounting arrangement of the disclosure can be used on any surface of the cargo area 12, including either sidewall 20, 22 as shown in the Figures. In one embodiment of the disclosure, each of the first and second sidewalls 20, 22 of the cargo area 12 includes an identical attachment configuration as is shown in the Figures. However, it is understood that the first and second sidewalls 20, 22 may have distinct configurations while accomplishing the purpose of the disclosure.

FIG. 2 illustrates the mounting arrangement disposed on a portion of the sidewall 22 of the cargo area 12 of the vehicle 10. Sidewall 22 includes an inner periphery 38 having a first or front attachment surface 40 provided proximate to the front wall 24 of the cargo area 12 and a second or rear attachment surface 42 provided proximate the tailgate 16 of cargo space 14. As is best shown in FIG. 3, at least one attachment point or tie down member 44 is provided on the inner periphery 38 of the sidewall 22 of the cargo area.

The at least one tie down member 44 may be formed as an arcuate shaped portion or eyelet that is mounted to or integrally formed with the sidewall 22 to receive and secure a mating portion of a restraint, such as a strap, rope, cable or the like that may be placed about a load to secure the load in the cargo area 12. The at least tie down member 44 may be formed in a variety of geometries and configurations to accomplish the purposes of the disclosure. In one embodiment of the disclosure and as shown in additionally in the rear portion of the sidewall in FIG. 5, a plurality of tie down members 44 are provided in a generally vertical arrangement on the sidewall 20.

Referring back to FIGS. 2-4, a mounting arrangement for use in accordance with this disclosure is described in greater detail. The mounting arrangement may include at least one mounting member or bracket 46 disposed proximate a rear portion of the sidewall 22 of the cargo area 12 and at least one receiving member 48 disposed proximate a front portion of the sidewall 22 of the cargo area 12. It is understood that the at least one mounting bracket 46 and at least one receiving member 48 may each be used to accomplish the objectives of this disclosure, or, alternatively, only one of the tie down and/or receiving members 44, 48 may be used to adjustably connect an auxiliary storage unit 26 to the vehicle cargo area 12. It is also understood that the at least one mounting bracket 46 and at least one receiving member 48 may be placed on either sidewall 20, 22 and adjacent either the front wall 24 or tailgate 16 of the cargo area 12 to accomplish the objectives of the disclosure.

Figure 5:
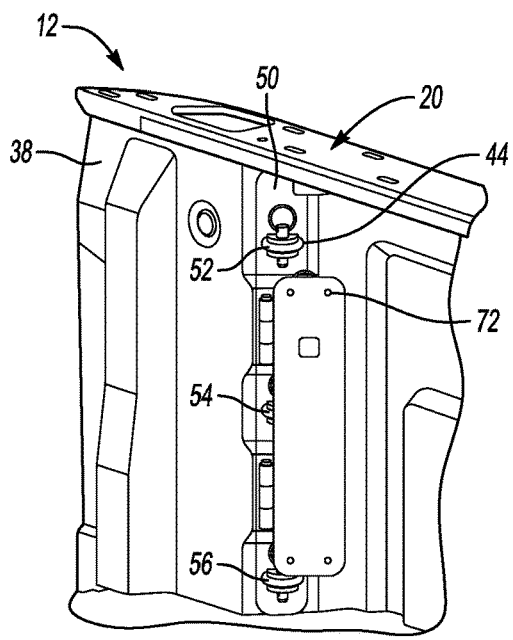
FIG. 5 is a perspective view of the mounting bracket of the mounting arrangement disposed on the rear portion of the sidewall of the cargo area.
Figure 6:
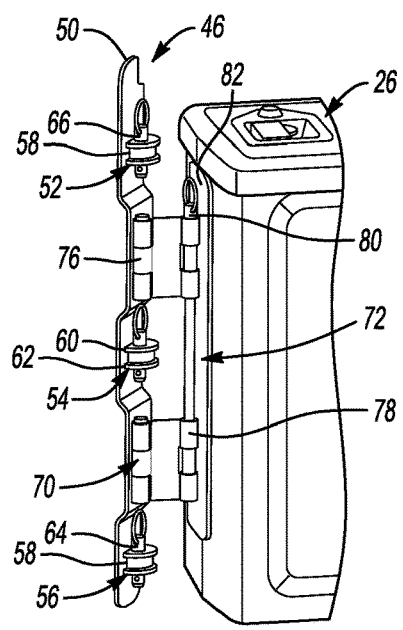
FIG. 6 is a perspective view of the mounting bracket and housing of the auxiliary storage unit of the disclosure.
Figure 7:
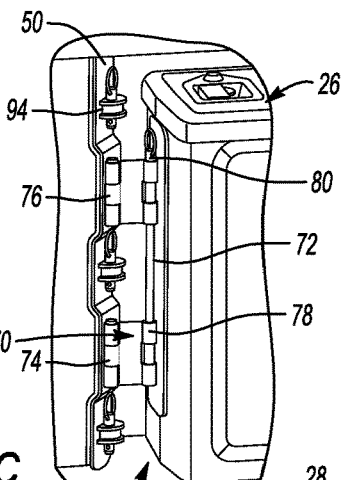
FIG. 7 is a perspective view of the mounting bracket releasably securing the at least on mounting arrangement adjustably connecting the auxiliary storage unit to the one or more tie down hooks in the cargo area of the vehicle.

The mounting arrangement for use with the vehicle 10 is illustrated in FIGS. 5-7. The at least one mounting bracket 46 may include an elongate bracket body 50 removably secured to the at least one tie down member 44 disposed on the sidewall 22 of the cargo area 12. Elongate bracket body 50 may be unitary body or may be a series of interconnected bodies. Elongate bracket body 50 extends generally vertically relative to the inner periphery 38 of the sidewall 22.

Elongate bracket body 50 includes one or more retention slots 52, 54, 56 formed therein that are sized to receive and engage corresponding tie down members 44 provided in the sidewall 22 of cargo area 12. A description of one of the retention slots 52 of the elongate bracket body 50 is provided for purposes of clarity. It should be appreciated that retention slots 52, 54, 56 may each be identically formed, or, in the alternative, one or more of the retention slots may be formed with a different configuration based upon a number of factors, including, but not limited to, the geometry of the elongate bracket body 50 or cargo area sidewall 22 and the position or configuration or the corresponding tie down member 44.

Retention slot 52 includes an aperture 58 defined by first and second flanges 60, 62 disposed on either side of the aperture 58. It is contemplated that the first flange 60 may be provided adjacent an upper surface of the aperture 58 while the second flange 62 may be provided adjacent a lower surface of the aperture 58. Each of the flanges 60, 62 includes an aperture 64 receiving a connecting member 66 therethrough.

The aperture 58 of retention slot 52 is sized to receive and align with a corresponding tie down member 44 in the sidewall 22. When the elongate bracket body 50 is placed in position adjacent the inner periphery 38 of the sidewall 22 of cargo area 12, tie down members 44 extend through apertures 58 in the retention slots 52, 54, 56.

Elongate bracket body 50 may be releasably secured to the sidewall 22 by one or more connecting members 66, such as a pin, fastener or the like. Connecting members 66 extend through the apertures 64 in flanges 60, 62 and the opening in the tie down member 44, as shown best in FIGS. 5 and 6. Connecting members 66 removably connect the elongate bracket body 50 to the sidewall 22 of the cargo area 12 such that the auxiliary storage unit 26 may be easily removed from the cargo area 12, allowing the cargo area 12 and tie down members 44 to be used for other purposes.

An auxiliary storage unit support 72 includes one or more hinge members 70 adjustably connecting the auxiliary storage unit 26 to the elongate bracket body 50. The one or more hinge members 70 include a first end 74 pivotally connected to the elongate bracket body 50 about a first joint 76 and an opposing second end 78 pivotally connected to the auxiliary storage unit support 72 about second joint 80. The auxiliary storage unit support 72 is secured to a portion of the auxiliary storage unit housing 28 such that housing 28 is adjustable relative to at least one of the first and second sidewalls 20, 22 between at least a first position and a second position.

Figure 8:
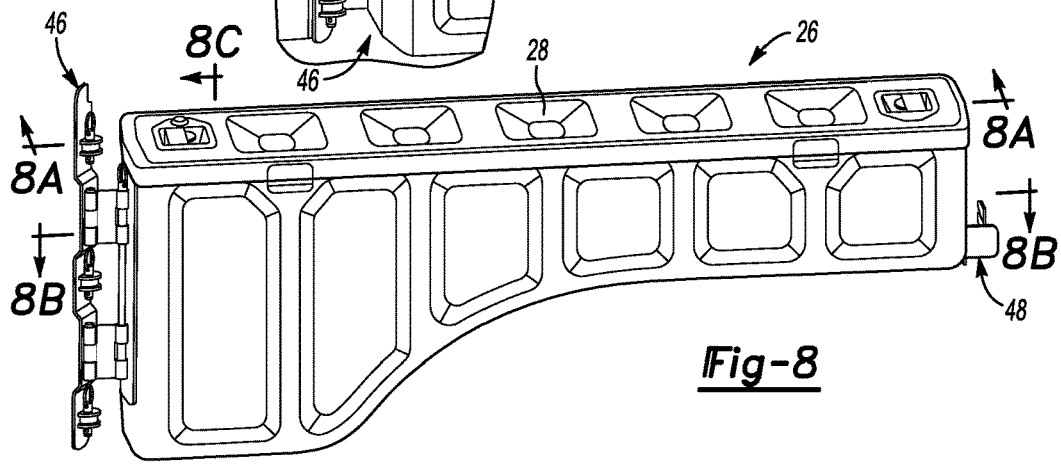
FIG. 8 is a perspective view of the auxiliary storage unit of the disclosure.
Figure 8A:
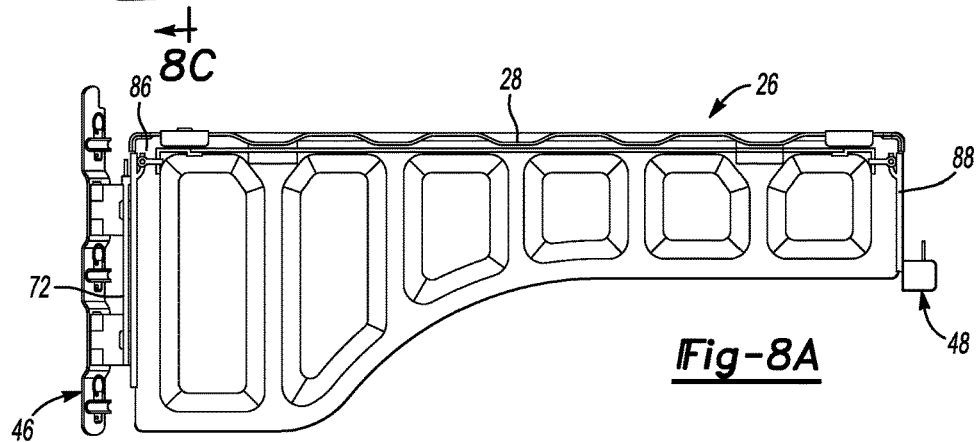
FIG. 8A is a front elevational view of the auxiliary storage unit along line A-A of FIG. 8.
Figure 8B:
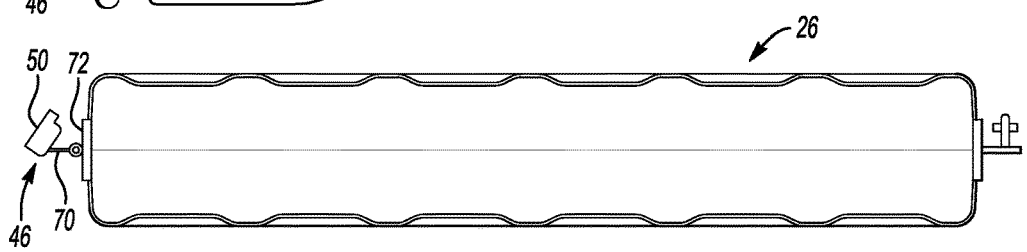
FIG. 8B is a top elevational view of the auxiliary storage unit along line B-B of FIG. 8.
Figure 8C:
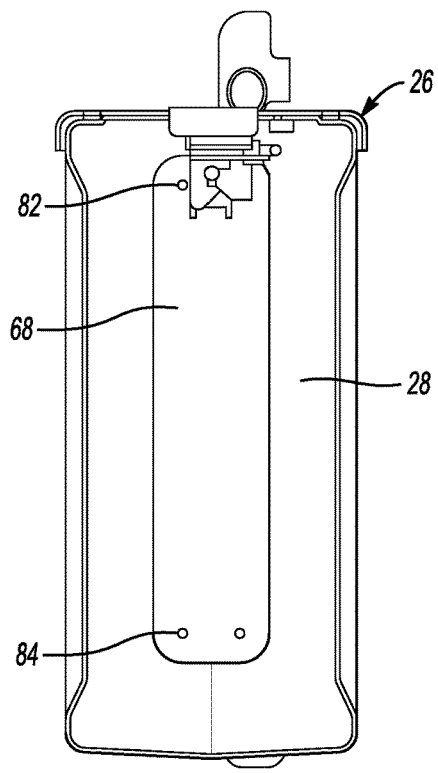
FIG. 8C is a cross sectional view of the interior of the auxiliary storage unit with a mounting plate configured to receive the mounting bracket along line C-C of FIG. 8.

In the example shown in FIG. 6, the auxiliary storage unit support 72 is secured to a side portion of the auxiliary storage unit housing 28 by one or more fasteners 82 extending through holes 84 in the support 72 to engage a receiving plate 68 disposed on the auxiliary storage unit housing 28 as best shown in FIG. 8C. Use of the first and second joints 76, 80 allows for greater degrees of adjustment positions for the auxiliary storage unit 26 to adjust relative to the cargo area 12 as shown in FIG. 7, including between a first or stored position as shown in FIG. 1A wherein the auxiliary storage unit 26 is positioned adjacent to and generally parallel with sidewall 20 and a second or deployed position as shown in FIG. 1B wherein the auxiliary storage unit 26 extends from the sidewall 20 to a position adjacent the tailgate 16 and substantially perpendicular to the sidewall 20.

Referring now to FIGS. 8-8C, the cooperation of the mounting bracket 46 and receiving member 48 of the mounting arrangement of the disclosure is described in greater detail. As is shown in FIG. 8A, the housing 28 of the auxiliary storage unit 26 may include a first side portion 86 disposed proximate a rear surface of the cargo area and an opposing second side portion 88 disposed proximate a front surface of the cargo area. The auxiliary storage unit support 72 is secured adjacent the first side portion 86 of auxiliary storage unit housing 28. As is best shown in FIG. 8B, the auxiliary storage unit support 72 is adjustably connected to the elongate bracket body 50 of the mounting bracket 46 by hinge member 70.

Figure 9:
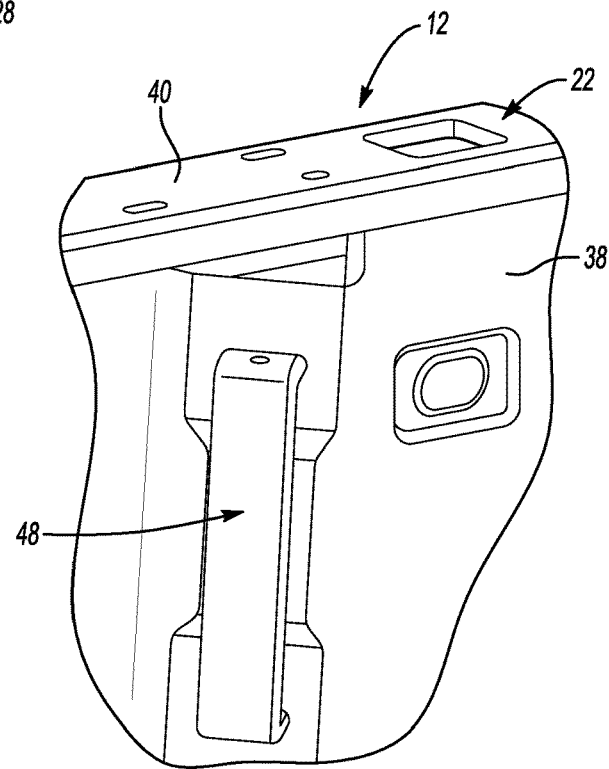
FIG. 9 is a perspective view of the receiving member of the mounting arrangement of the disclosure.
Figure 10:
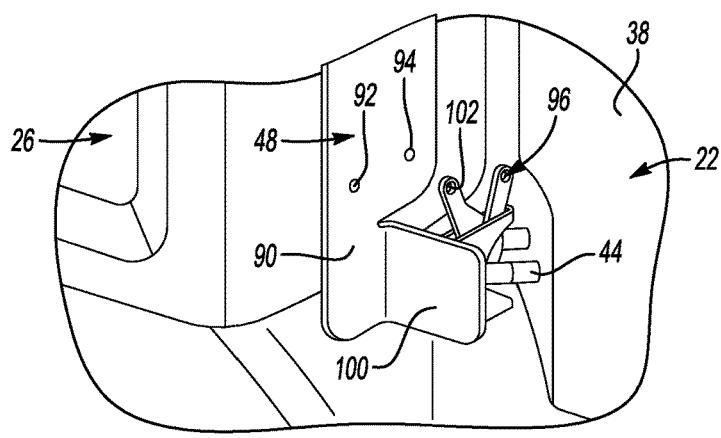
FIG. 10 is a perspective view of the receiving member removably securing the auxiliary storage unit to the at least one tie down member in the cargo area of the vehicle.

Referring now to FIGS. 9 and 10, the receiving member 48 of the mounting arrangement of the disclosure is described in greater detail. A mounting bracket 90 of the receiving member 48 securable adjacent the second side portion 88 of the housing 28 of the auxiliary storage unit 26. Mounting bracket 90 may include a plurality of holes 92 configured to receive a fastener or other securement mechanism 94 therethrough.

In another embodiment of the disclosure, it is contemplated that mounting bracket 46 and receiving member 48 may be adhered to the housing 28 of auxiliary storage unit 26 by an adhesive or the like. Alternatively, in another embodiment of the disclosure, it is contemplated that one or both of the auxiliary storage unit support 72 of the mounting bracket 46 and mounting bracket 90 of the receiving member 48 may be integrally formed into the housing 28 of the auxiliary storage unit 26.

Referring now to FIG. 10, receiving member 48 may include a locking device 96 configured to engage and releasably secure the auxiliary storage unit 26 adjacent the sidewall of the cargo area and movable between a locked position and an open position as referenced by number 102. In one non-limiting embodiment of the disclosure, a receiving bracket or other receiving surface may be secured to at least one tie down member disposed in the sidewall such that the receiving bracket can be removed from the cargo area to allow use of the tie down members 44 for other purposes. In another embodiment of the disclosure, the receiving bracket may be mounted directly to the sidewall of the cargo area to releasably engage the locking device of the receiving member.

The locking device 96 of the receiving member 48 may include a variety of configurations to ensure securement of the auxiliary storage unit adjacent the sidewall 22 of the cargo area 12. An arm 100 extends generally perpendicular from the mounting bracket 90 to receive and support a locking device 96. The locking device 96 shown in FIG. 10 illustrates a bar type latching mechanism.

It is understood that other latching arrangements, including, but not limited to, a spring pin, locking pin, detent pin and the like may also be use. When the auxiliary storage unit 26 is placed adjacent the inner periphery 38 of the sidewall 22 of the cargo area, the locking device 96 releasably engages a tie down member 44 disposed on the sidewall 22. In an alternative embodiment of the disclosure, locking device 96 may be configured to releasably engage a portion of the receiving bracket disposed on the sidewall of the cargo area.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims.

The invention claimed is:

1. A vehicle comprising:
   a cargo area at least partially defined by a first sidewall, a second sidewall disposed opposite the first sidewall and a floor cooperating with and extending between the first and second sidewalls;
   at least one tie down member disposed on at least one of the first and second sidewalls; and
   an auxiliary storage unit releasably secured to the at least one tie down member, the auxiliary storage unit including:
   a housing defining an outer periphery and an inner periphery,
   a panel adjustably connected to a portion of the housing and movable between a closed position wherein the panel is at least partially covering the inner periphery of the housing and at least one open position,
   an auxiliary storage unit mounting bracket including an elongate bracket body removably secured to the at least one tie down member,
   an auxiliary storage unit support disposed proximate to and cooperating with a first side portion of the outer periphery of the auxiliary storage unit housing, and
   at least one hinge pivotally connecting the elongate bracket body of the auxiliary storage unit mounting bracket and the auxiliary storage unit support,
   wherein the auxiliary storage unit is adjustable relative to at least one of the first and second sidewalls between at least a first position and a second position.

2. The vehicle of claim 1 wherein the at least one tie down member disposed on at least one of the first and second sidewalls extends through one or more retention slots defined by the elongate bracket body.

3. The vehicle of claim 2 wherein the elongate bracket body further comprises an upper flange and an opposing lower flange cooperating to define the one or more retention slots in the elongate bracket body and sized to receive and align with the at least one tie down member.

4. The vehicle of claim 3 further comprising a connector extending at least partially through each of the upper and lower flanges of the elongate bracket body and the at least one tie down member to releasably secure the auxiliary storage unit to the at least one tie down member.

5. The vehicle of claim 1 further comprising a receiving member including a mounting bracket disposed proximate to and cooperating with a second side portion of the outer periphery of the auxiliary storage unit housing and a locking device cooperating with the mounting bracket to releasably engage the at least one tie down member and secure the auxiliary storage unit adjacent at least one of the first and second sidewalls of the cargo area.

6. The vehicle of claim 1 wherein the vehicle cargo area further comprises a storage compartment of a pickup truck defined by the first sidewall, the second sidewall disposed opposite the first sidewall, the floor cooperating with the opposing first and second sidewalls and a tailgate adjustably connected to one of the first sidewall, second sidewall or the floor to adjustably position the tailgate between at least a first position wherein the tailgate is disposed proximate to and substantially parallel with the floor and a second position wherein the tailgate is disposed proximate to and extending substantially perpendicularly relative to the floor.

7. An auxiliary storage unit releasably secured to at least one tie down member disposed on at least one sidewall of a vehicle cargo area, the auxiliary storage unit comprising:
 a housing defining an outer periphery and an inner periphery;
 a panel adjustably connected to a portion of the housing and movable between a closed position wherein the panel is at least partially covering the inner periphery of the housing and at least one open position; and
 an auxiliary storage unit mounting bracket including an elongate bracket body removably secured to the at least one tie down member disposed on the at least one sidewall of the vehicle cargo area and an auxiliary storage unit support disposed proximate to and cooperating with a first side portion of the outer periphery of the auxiliary storage unit housing,
 wherein the auxiliary storage unit mounting bracket further comprises one or more hinge members adjustably connecting the elongate bracket body and the auxiliary storage unit support to removably connect the auxiliary storage unit to the at least one tie down member to adjustably position the auxiliary storage unit relative to the vehicle cargo area.

8. The auxiliary storage unit of claim 7 wherein the elongate bracket body further comprises an upper flange and an opposing lower flange cooperating to define one or more retention slots in the elongate bracket body sized to receive and align with the at least one tie down member disposed in the vehicle cargo area.

9. The auxiliary storage unit of claim 8 further comprising a connector extending at least partially through each of the upper and lower flanges of the elongate bracket body the at least one tie down member to releasably secure the auxiliary storage unit to the at least one tie down member.

10. The auxiliary storage unit of claim 7 further comprising a receiving member including a mounting bracket disposed proximate to and cooperating with a second side portion of the outer periphery of the auxiliary storage unit housing and a locking device cooperating with the mounting bracket to releasably engage the at least one tie down member disposed on the at least one sidewall and secure the auxiliary storage unit adjacent the sidewall of the cargo area.

11. The auxiliary storage unit of claim 7 wherein the housing further comprises one or more compartments formed in the inner periphery of the housing.

12. The auxiliary storage unit of claim 7 wherein the housing further comprises at least one drawer slidably connected to the inner periphery of the auxiliary storage unit.

13. An auxiliary storage unit releasably secured to a vehicle cargo area comprising:
 a housing defining an outer periphery and an inner periphery, wherein the housing includes at least one drawer slidably connected in the inner periphery of the housing;
 a panel adjustably connected to a portion of the housing and movable between at least a closed position wherein the panel is at least partially covering the inner periphery of the housing and at least one open position; and
 an auxiliary storage unit mounting bracket including an elongate bracket body removably secured to the vehicle cargo area and an auxiliary storage unit support disposed proximate to and cooperating with a first side portion of the outer periphery of the auxiliary storage unit housing,
 wherein the auxiliary storage unit mounting bracket further comprises one or more hinge members adjustably connecting the elongate bracket body and the auxiliary storage unit support to removably connect and adjustably position the auxiliary storage unit relative to the vehicle cargo area.

14. The auxiliary storage unit of claim 13 wherein at least one tie down member is disposed in the vehicle cargo area and cooperates with the auxiliary storage mounting bracket to removably connect and adjustably position the auxiliary storage unit relative to the vehicle cargo area.

15. The auxiliary storage unit of claim 14 further comprising a receiving member including a mounting bracket disposed proximate to and cooperating with a second side portion of the outer periphery of the auxiliary storage unit housing and a locking device cooperating with the mounting bracket to releasably engage the at least one tie down member disposed on the at least one sidewall and secure the auxiliary storage unit adjacent the sidewall of the cargo area.

16. The auxiliary storage unit of claim 14 wherein the elongate bracket body further comprises an upper flange and an opposing lower flange cooperating to define one or more retention slots in the elongate bracket body sized to receive and align with the at least one tie down member disposed in the vehicle cargo area.

17. The auxiliary storage unit of claim 16 further comprising a connector extending at least partially through each of the upper and lower flanges of the elongate bracket body the at least one tie down member to releasably secure the auxiliary storage unit to the at least one tie down member.

18. The auxiliary storage unit of claim 13 wherein the housing further comprises one or more compartments formed in the inner periphery of the housing.

* * * * *